US006859272B2

(12) United States Patent
Rutzke et al.

(10) Patent No.: US 6,859,272 B2
(45) Date of Patent: Feb. 22, 2005

(54) SPECTROMETER SAMPLE GENERATING AND INJECTING SYSTEM USING A MICROLITER NEBULIZER

(75) Inventors: Michael A. Rutzke, Brooktondale, NY (US); Steven D. Sweat, Keene, TX (US)

(73) Assignee: Cornell Research Foundation, Inc., Ithaca, NY (US)

(*) Notice: Subject to any disclaimer, the term of this patent is extended or adjusted under 35 U.S.C. 154(b) by 30 days.

(21) Appl. No.: 10/309,316

(22) Filed: Dec. 4, 2002

(65) Prior Publication Data

US 2003/0213907 A1 Nov. 20, 2003

Related U.S. Application Data

(63) Continuation-in-part of application No. 09/466,456, filed on Dec. 17, 1999, now abandoned.

(51) Int. Cl.[7] .......................... G01J 3/443; G01N 21/73

(52) U.S. Cl. ....................... 356/316; 356/328; 239/423; 239/518

(58) Field of Search ................................ 356/315, 316; 239/423, 518

(56) References Cited

U.S. PATENT DOCUMENTS 433,954 A 9/1890 McElroy
1,978,566 A 9/1934 Cole
2,940,673 A 9/1960 Budwig
2,948,480 A 9/1960 Budwig
3,172,406 A 3/1965 Bird et al.
D202,399 S 9/1965 Cheney
3,438,711 A * 4/1969 Hell ........................... 356/315
3,486,836 A * 12/1969 Venghiattis ................. 356/315
4,413,784 A 11/1983 Dea
4,798,190 A 1/1989 Vaznaian et al.
4,880,164 A 11/1989 Noordermeer
5,033,541 A * 7/1991 D'Silva ...................... 165/155
5,054,478 A 10/1991 Grychowski et al.
5,289,871 A 3/1994 Leidinger
5,411,208 A 5/1995 Burgener
5,534,998 A * 7/1996 Eastgate et al. ............ 356/316
D389,557 S 1/1998 Sweat
5,884,846 A 3/1999 Tan

* cited by examiner

*Primary Examiner*—F. L. Evans
(74) *Attorney, Agent, or Firm*—Jones, Tullar & Cooper PC

(57) ABSTRACT

A system atomizes liquids into a gaseous medium for formation and injection of a sample into an analytical apparatus, such as a plasma spectrometer. The system employs a high efficiency nebulizer that generates a fine aerosol through use of a nozzle having improved surface wetness characteristics, preferably in combination with a deflecting surface. A desolvator is employed to remove excess solvent from the atomized sample prior to injection into the spectrometer to avoid temperature reduction or extinguishment of the plasma by the sample.

28 Claims, 8 Drawing Sheets

SPECTROMETER SAMPLE GENERATING AND INJECTING SYSTEM USING A MICROLITER NEBULIZER

CROSS REFERENCE TO RELATED APPLICATIONS

This application is a Continuation-in-Part under 35 U.S.C. § 120 U.S. application Ser. No. 09/466,456, which was filed on Dec. 17, 1999 now abandoned and is hereby incorporated by reference in its entirety. This application is hereinafter referred to as the "parent '456 application."

BACKGROUND OF THE INVENTION

1. Field of the Invention

The present invention relates in general to a system for generating atomized samples and injecting the atomized samples into analytical equipment, such as a plasma emission spectrometer, for example.

2. Description of the Background Art

Plasma emission spectrometers are highly sensitive devices that are employed to analyze samples for the presence of various elements or impurities therein. For example, drinking water is often analyzed for impurities by using an emission spectrometer. This is an important application due to increasingly strict impurity limits set for drinking water by the EPA. In particular, drinking water may contain trace levels of certain poisonous elements, such as lead and arsenic, but the allowable limits for these impurities are understandably very low. As a result, highly sensitive devices must be used to detect the levels of these impurities.

A plasma emission spectrometer operates by subjecting a sample to a high temperature plasma, which excites any elements that are present in the sample and causes them to emit radiation. The wavelengths of the radiation depend on the elements in the sample and thereby act as signatures for the elements. The spectrometer therefore separates the radiation into its individual wavelength components to facilitate identification of the specific elements in the sample. The intensity of the emissions at any given wavelength is proportional to the level of the corresponding elements in the sample.

In order to analyze a liquid sample, such as drinking water, with a plasma emission spectrometer, the sample must first be atomized with a carrier gas, such as argon, before being injected into the plasma. This is necessary because injection of a pure liquid into the plasma would result in extinguishment of the plasma, thereby preventing the device from functioning. To maximize detectability of the trace impurities in a liquid sample, it is therefore necessary to atomize the sample into very fine droplets by interaction of the sample with the high pressure carrier gas stream.

A device known as a nebulizer is employed to generate the atomized sample. A popular type of nebulizer known as a Babington pneumatic nebulizer operates by entraining a liquid sample in a gas stream in the following manner. The liquid sample is fed at low pressure through a first passage to a first outlet. The atomizing gas is fed at high pressure through a second passage out a second outlet that is parallel to and closely spaced to the first outlet. As the high pressure gas exits the second outlet, it creates a low pressure area around the second outlet that draws liquid exiting the first outlet into the gas stream. As the liquid is drawn into the gas stream, the droplets therein are broken down by the force of the high pressure gas into a fine aerosolized mist. If the mist is fine enough and can be injected into the plasma emission spectrometer at a low enough flow rate, e.g., less than 0.1 grams per minute, then the sample will not extinguish the plasma and can therefore be subjected to spectrum analysis.

One problem that is inherently associated with the use of nebulizers to generate emissions in a plasma spectrometer, is that the efficiency of such devices is fairly low, which limits the amount of detectable trace impurities that actually end up in the atomized sample. The atomization efficiency with which a nebulizer operates is measured as the percentage of the liquid sample that is actually atomized with the gas stream. Until recently, typical nebulizers had an efficiency of around 1 or 2%. In addition, it is often the case that only small samples of liquid are available for analysis. As a result, if a small sample of liquid having very low levels of trace impurities is atomized with a prior art nebulizer, the amount of detectable trace elements in the atomized sample would likely be too low to be detected by the spectrometer. In addition, small samples present the added problem of requiring very low flow rates into the nebulizer that leads to other problems, including for example, pulsation and intermittent aerosol formation.

Even if a higher efficiency nebulizer could be devised that operates well at low flow rates, another problem is presented when the sample is injected into a plasma emission spectrometer. In particular, the increased liquid content of the atomized sample has a tendency to reduce the temperature of the plasma, thus decreasing the intensity of the resulting emissions and counteracting the benefits of increase atomization efficiency. In some cases, the plasma may even be extinguished by the sample. One solution to this problem is to employ a cyclonic separator between the nebulizer and the spectrometer that separates excess liquid from the sample. Unfortunately, tests on such devices using the high efficiency nebulizer disclosed in the parent '456 application, indicate that the cyclonic separator has the effect of counteracting most of the increased efficiency of the high efficiency nebulizer. As a result, a need therefore remains not only for an increased efficiency nebulizer that can operate at low flow rates, but also for a sample injection system that can remove excess solvent from an atomized sample without counteracting the benefits of increased efficiency.

SUMMARY OF THE INVENTION

The present invention fulfills the foregoing need through provision of a sample generating and injecting system that utilizes a high efficiency, low flow rate nebulizer in combination with a desolvator. The desolvator removes excess solvent or liquid from an atomized sample without substantially reducing the atomization efficiency of the solid elements in the sample. As a result, the desolved sample can be injected into a plasma emission spectrometer without lowering the temperature of, or extinguishing, the plasma. The combination of the high efficiency nebulizer with the desolvator thus provides a synergistic benefit of substantially improved measurement sensitivity of the plasma emission spectrometer, thus allowing detection of very small trace levels of elements that could not previously have been detected.

In the preferred embodiment, the high efficiency nebulizer disclosed in the parent '456 application is employed to generate an atomized sample. This nebulizer is capable of low flow rates on the order of 0.1 mL/minute, while providing an atomization efficiency that is up to 3 to 4 times greater than known prior art Babington pneumatic type nebulizers, depending on the flow rate. The nebulizer is also of the Babington pneumatic type and has two parallel passages terminating at two corresponding orifices at a discharge end of the nebulizer. The surface of the discharge end in the area between and surrounding the two outlets includes means for enhancing surface wetness through removal of hydrophobic regions. In particular, the surface wetness is enhanced by roughening the surface using any suitable technique, such as by grinding or sanding until the surface has a roughness similar to that of 600 grit sandpaper. This results in increased atomization efficiency by virtue of the fact that a film of liquid is formed on the roughened surface that readily gets drawn smoothly into the gas stream being ejected from the gas outlet. An angled deflector plate is also preferably employed that enhances formation of a mass of liquid near the gas outlet and deflects the resulting atomized sample, this impact further breaking up the liquid droplets therein and enhancing atomization efficiency. To increase efficiency even further and insure that the nebulizer can operate at low flow rates, the two discharge orifices are spaced closely together, on the order of 1 mm of less and the diameters of the orifices are on the order of 0.5 mm for the liquid discharge orifice and 0.10 mm for the gas discharge orifice. The overall diameter of the nebulizer at the discharge end is preferably on the order of 2 mm or less.

As discussed previously, the increased efficiency of the nebulizer disclosed in the parent '456 application could not be fully appreciated when used with a plasma emission spectrometer. This is because the increased atomization increased solvent content in the sample, which reduced the plasma temperature, thereby decreasing the measurement sensitivity of the spectrometer. The present invention overcomes this drawback through provision of a desolvator that removes excess liquid solvent from the atomized sample being ejected by the nebulizer while still preserving a substantial amount of the increase in elemental solids that are atomized by the high efficiency nebulizer in the sample. As a result, when the sample is injected into a plasma emission spectrometer, the intensity of the analyte signal generated thereby is as much as 3 or 4 times greater than is obtainable with the same high efficiency nebulizer, but without the desolvator.

The desolvator includes two key elements: a heater and a condenser. The atomized sample ejected by the high efficiency nebulizer is first directed into a conventional spray chamber where the larger solvent droplets that are not atomized by the nebulizer are separated by centripetal force and gravity, and are then removed through a drain. Next, the atomized sample passes through a heater tube, which preferably heats and dries the sample by heating the inside of the tube to approximately 120 degrees centigrade. After passing through the heater tube, the atomized sample is fed upward through a condensing tube, which is cooled by any suitable means, such as air or peltier cooling elements. The condensing tube serves to cool the atomized sample, which causes most, e.g., 90%, of the liquid solvent in the atomized sample to condense and fall into a liquid trap at the bottom of the condensing tube. This results in the atomized sample resembling an atomized powder (analyte) that is formed predominantly of the elemental solids to be detected by the spectrometer. From the condensing tube, the desolved atomized sample is then directed into the plasma torch of the emission spectrometer. The reduction in sample solvent significantly reduces solvent loading into the plasma torch and concomitantly enhances sample signal strength to the point that levels of trace elements can now readily be detected that could not be detected with the same system without the desolvator.

BRIEF DESCRIPTION OF THE DRAWINGS

The foregoing and other features and advantages of the present invention will become apparent from the following detailed description of a preferred embodiment thereof, taken in conjunction with the accompanying drawings, in which.

DETAILED DESCRIPTION OF THE PREFERRED EMBODIMENT

The present invention relates not only to a unique low flow rate, high efficiency nebulizer that is particularly suited for generating atomized samples for use in a plasma emission spectrometer, but also to an overall spectrometer based sample analysis system that employs a unique sample generating and injecting system, which in turn employs the unique nebulizer. A detailed discussion of each of these systems and elements follows.

Figure 1:
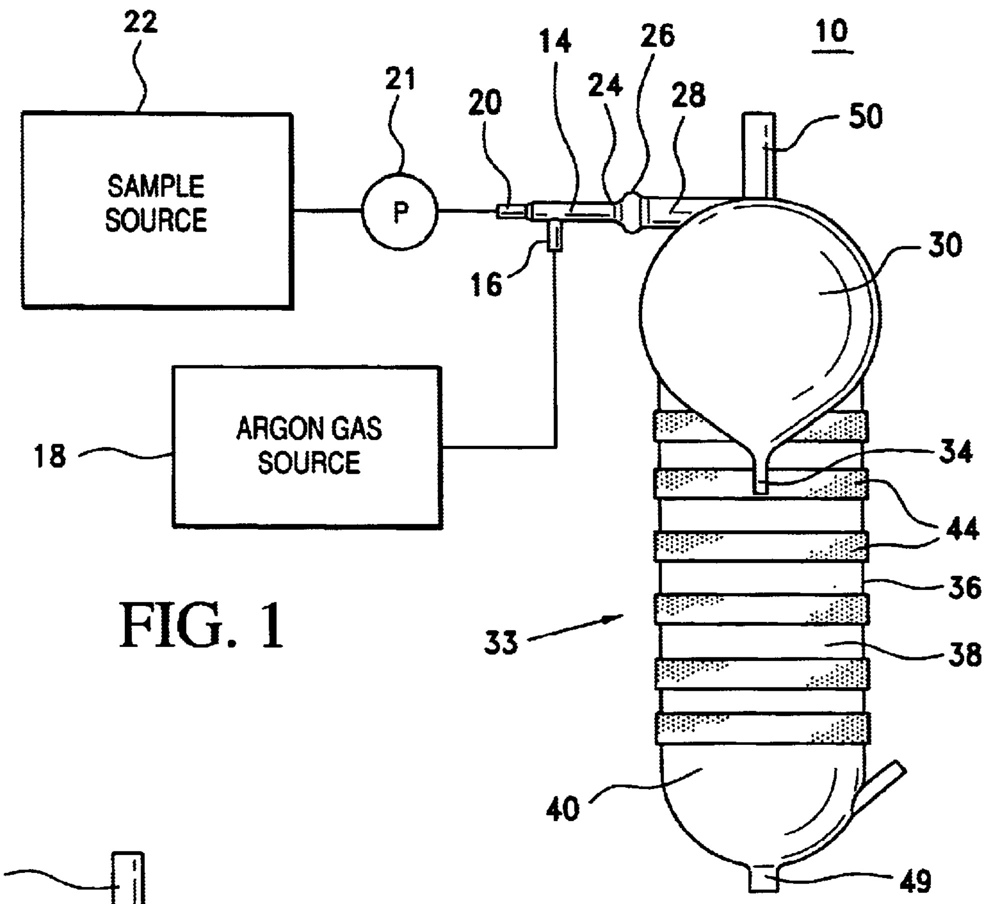
FIGS. 1 and 2 are front and side views, respectively, of a system constructed in accordance with a preferred embodiment of the present invention for generating and injecting an atomized sample into a plasma emission spectrometer.
Figure 2:
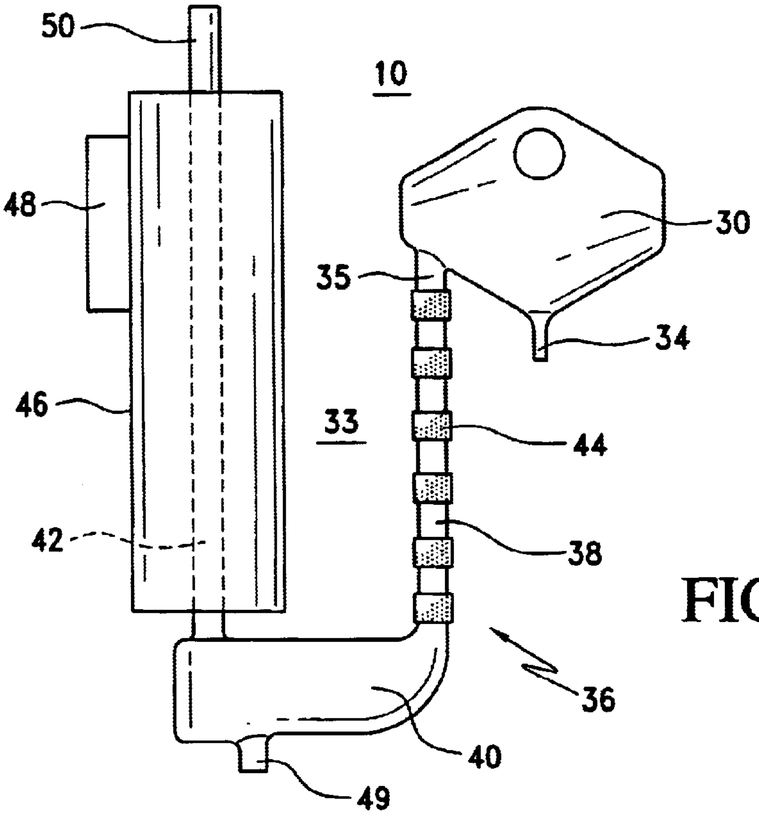

With reference first to FIGS. 1 and 2, a sample generating and injecting system 10 is illustrated that is constructed in accordance with the preferred embodiment for generating and injecting atomized samples into a plasma emission spectrometer. The system 10 combined with a spectrometer system 12 illustrated in FIG. 3 form the overall spectrometer based sample analysis system. The sample generating and injecting system 10 is capable of producing an aerosol comprised of small, evenly sized liquid particles in a carrier gas. Liquid samples may include, for example, drinking water samples and samples from sources such as organic pesticide residues, trace metallic element samples, metallurgical analysis, mine waste dumps and forensic evidence in criminal investigations. Carrier gases are generally inert gases, e.g., argon, but any compatible gas or combination of gases may be employed. The system 10 includes a high efficiency nebulizer 14, which is preferably of the type disclosed in the parent '456 application and is described in greater detail herein in conjunction with FIGS. 4 and 5. The nebulizer 14 includes a gas inlet 16 that is connected to a source of high pressure argon carrier gas 18 and a liquid sample inlet 20, that is connected to an outlet of a suitable low flow rate pump 21, such as a peristaltic pump, which pumps a liquid sample from a sample source 22 into the sample inlet 20.

The nebulizer 14 has a discharge end 24 that is connected by means of a double o-ring connection 26 to an inlet 28 of a spray chamber 30. The purpose of the spray chamber 30 is to remove excess larger solvent droplets that are not atomized by the nebulizer 14. A sample outlet 32 of the spray chamber 30 is connected to a desolvator 33. A drain outlet 34 is also provided in the spray chamber 30 for removing excess solvent collected therein.

The desolvator 33 includes the following elements. A first end 35 of a u-shaped rectangular glass tube 36 receives the atomized sample from the spray chamber 30. The glass tube 36 forms three distinct components of the desolvator 33: a heater tube 38, a solvent catcher 40 and a condensing tube 42. The condensing tube 42 is positioned upwardly or vertically so that the atomized sample will pass up there through to facilitate gravity separation of excess solvent during the condensing phase.

Any suitable means of heating the heating tube 38 is employed, such as a coiled wrap of electrical heating tape 44. Preferably, the heating tape 44 heats the atomized sample in the heating tube 38 to approximately 120 degrees centigrade. Similarly, any suitable means for cooling the condensing tube 42 is also provided, such as a cooling jacket 46 and an electric fan 48. As another example, peltier cooling elements could also be employed. The solvent catcher 40 includes a solvent drain outlet 49 for removing excess solvent there from. A second, discharge end 50 of the glass tube 36 is provided for connecting the desolvator 33 to an inlet tube 52 of the plasma emission spectrometer system 12 as illustrated in FIG. 3.

Preferably, the rectangular tube 36 has a width as viewed in FIG. 1 of approximately 1.75 inches, while the preferred thickness of the heater and condensing tubes 38 and 42 as viewed in FIG. 2 is on the order of 0.30 inches. The height of the solvent catcher 40 as viewed in FIG. 2 is approximately 0.75 inches. Finally, the overall height of the u-shaped tube 36 is approximately 8.25 inches. The dimensions in the condensing tube 42 are the most critical to insure that the maximum amount of excess solvent will be condensed out of the atomized sample. The maximum dimensions for the heater and the condensing tubes 38 and 42 are length up 10 inches high, up to 3 inches wide and 1.0 inch thick. If these maximum values are exceeded, the surface to volume ratio decreases in the heating and condensing tubes 38 and 42, which results in incomplete heating and condensing.

Figure 3:
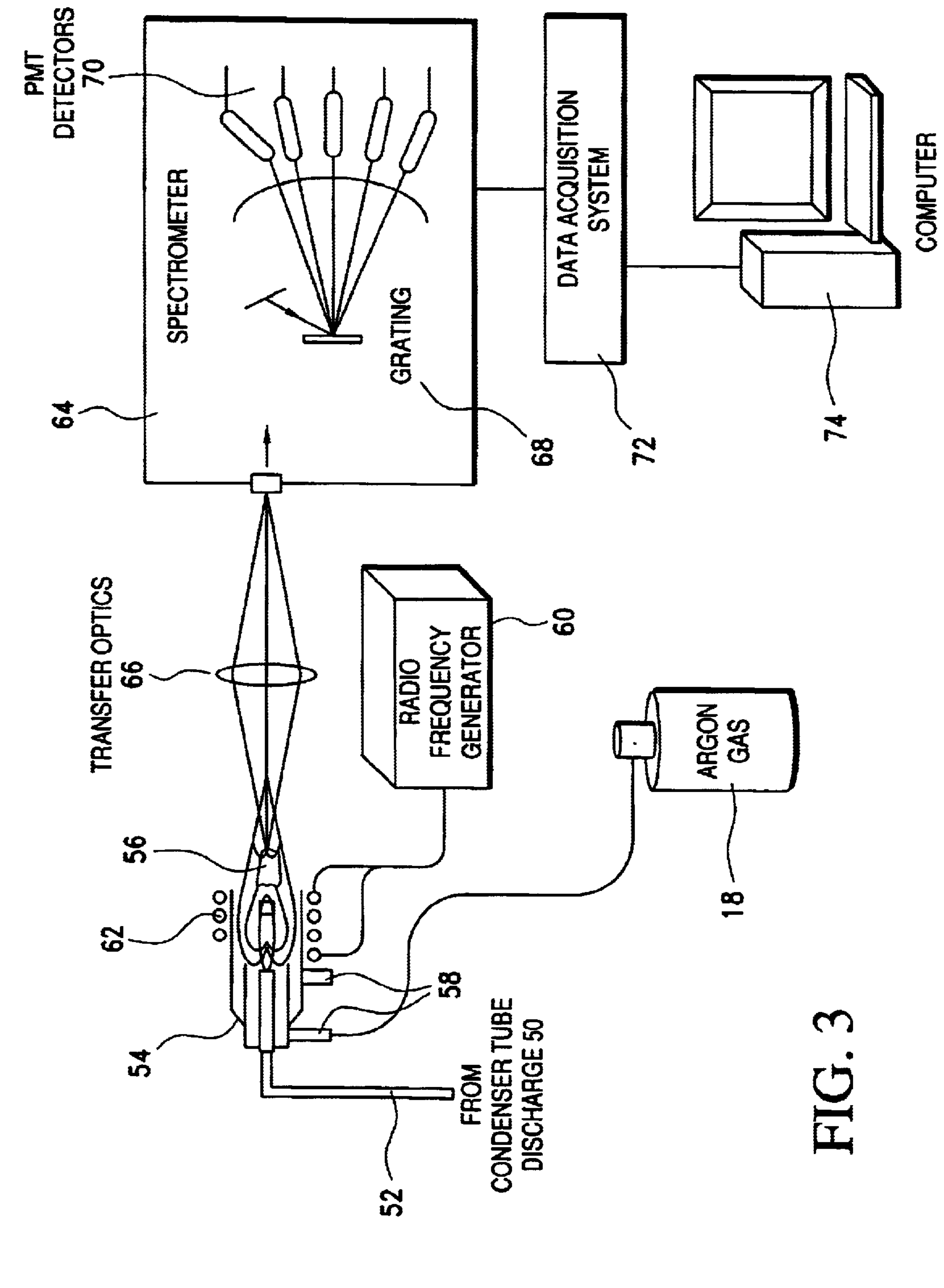
FIG. 3 is a schematic diagram of a plasma emission spectrometer system with which the system of FIGS. 1 and 2 is designed to be used.

With reference to FIG. 3, the spectrometer system 12 is preferably of a type known as an inductively coupled argon plasma atomic emission spectrometer, otherwise known by the acronym ICP-AES. As is well known in the art, the spectrometer system 12 includes a quartz plasma tube 54 for containing an argon plasma torch or flame 56. The desolved sample from the discharge end 50 of the desolvator 33 is directed through the inlet tube 52 to the center of the plasma torch 56. The same argon gas source 18 that supplies the carrier gas to the nebulizer 14 also supplies argon gas to first and second inlets 58 of the quartz plasma tube 54. A radio frequency generator 60 supplies power to an inductive heating coil 62 that surrounds the quart plasma tube 54.

As the heating coil 62 heats the plasma, any elements contained in the atomized and desolved sample from the desolvator 33 will emit radiation including selected wavelengths, depending on the identity of the elements. This radiation is detected by a spectrometer 64, which receives the radiation through a collection of transfer optics 66 and includes a diffraction grating 68 for separating the radiation into its various wavelength components. The diffraction grating 68 directs the separated radiation to a plurality of photomultiplier tubes (PMTs) 70, which detect and convert the radiation into electrical signals that are fed into a data acquisition system 72. The data acquisition system 72 is in turn connected to a computer 74 for spectrum analysis of the detected signals.

Figure 5:
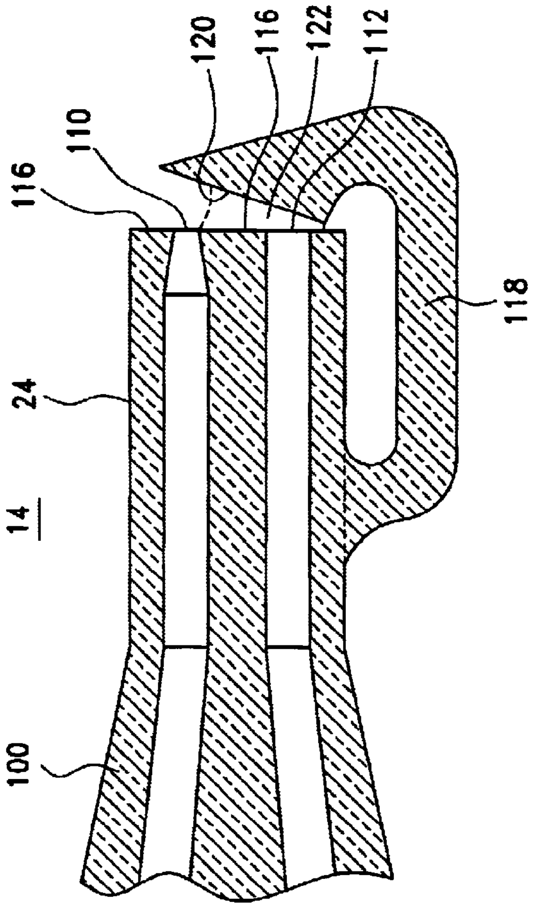
FIG. 5 is close up view of a discharge end of the nebulizer of FIG. 4.
Figure 4:
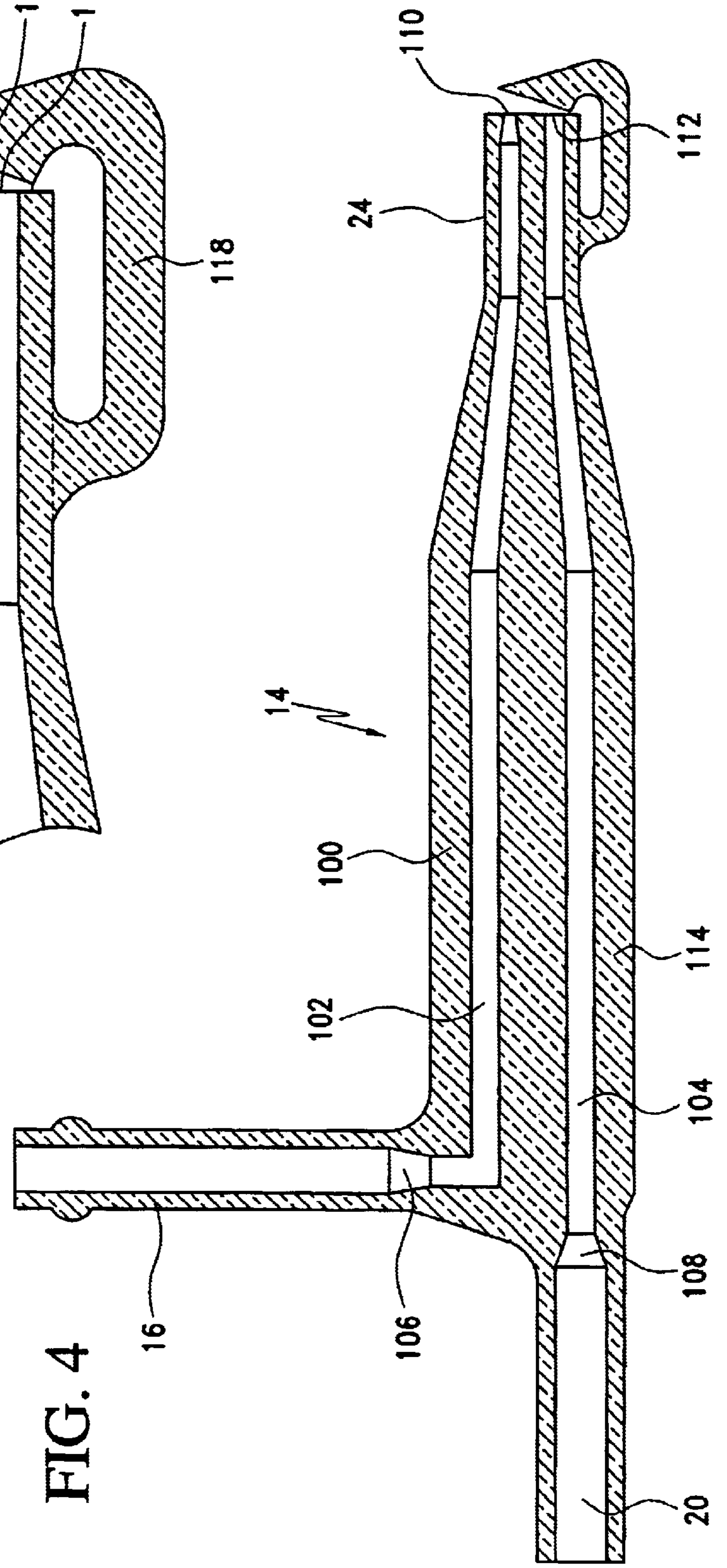
FIG. 4 is a schematic illustration of a high efficiency nebulizer that is preferably employed in the system of FIGS. 1 and 2.

The details of the nebulizer 14 are illustrated in FIGS. 4 and 5. The nebulizer 14 is designed to operate with liquid flows from a 0.01 mL/minute to more than 2 mL/minute without clogging or pulsating. As shown, the nebulizer 14 includes a body 100 that is preferably formed from glass though other construction materials, such a ceramic, plastic or metal, may be employed. First and second generally parallel longitudinal bores or passages 102 and 104 are formed in the nebulizer body 100. In the preferred embodiment, the gas and liquid sample inlet tubes 16 and 20 are formed integrally with the nebulizer body 100 and are connected to first and second inlet ends 106 and 108, respectively, of the passages 102 and 104. The passages 102 and 104 terminate at first and second, closely spaced discharge orifices 110 and 112, respectively, that are disposed at the discharge end 24 of the nebulizer 14. With this arrangement, the high pressure gas stream that is ejected through the gas discharge orifice 110 cause a low pressure area adjacent the orifice 110 that draws liquid from the sample discharge orifice 112 into the gas stream, thereby forming the atomized sample.

The dimensions of the nebulizer 14 are important since they contribute substantially to the increase in efficiency that is demonstrated by the nebulizer 14. Near an inlet end 114 of the nebulizer 14, the nebulizer body 100 has an outer diameter of approximately 6.0 mm, which is similar to the size of prior art nebulizers at their discharge ends. The diameter of the discharge end 24 of the nebulizer 14 is preferably much smaller, about 2.0 mm and no larger than 3.0 mm. The maximum separation of the two orifices should be no more than 1.0 mm and the preferred diameters of the orifices are approximately 0.5 mm for the liquid orifice and 0.1 mm for the gas orifice.

To improve atomization efficiency further, the discharge end 24 has a roughened ground end surface 116 that is preferably formed by briefly grinding the end surface 116 using any suitable technique, such as a diamond surfaced grinding disk. This eliminates any polish to the end surface 116 that would act to repel water and inhibit atomization. The roughened surface enhances surface wetness so that a thin film of liquid can form on the surface surrounding the gas discharge orifice 110. This increases the tendency for the liquid film to become entrained in the gas stream.

Preferably, one end of a glass rod 118 having an approximate outer diameter 0.75 mm is ground to a smooth 45 degree angled surface, cut to approximately 6.5 mm in length, fused or otherwise attached to the side of the nebulizer body 100 proximal to the sample discharge orifice 112 and bent, so that the angled surface is appropriately positioned to form a deflector or striker plate 120 that is struck by the aerosol stream exiting the nebulizer 14, which further breaks up the liquid droplets in the atomized sample. This element also results in the formation of a liquid mass 122 between the deflector plate 120 and the end surface 116 of the nebulizer 14 from which the gas stream also draws liquid. While the striker plate of deflector 120 is preferred and substantially increases the efficiency of the nebulizer 14, it will be understood that this element could be left off of the nebulizer 14 if desired for applications where the added efficiency is not necessary.

In operation, the liquid from the sample source 22 is atomized with the argon carrier gas stream by the nebulizer 14 and injected into the spray chamber 30. The atomized sample then passes through the u-shaped tube 36 of the desolvator 33 by first passing though the heater tube 38, where the sample is preferably heated to 120 degrees centigrade. The heated sample then passes up through the condensing tube 42, where the sample is cooled, thus causing 90% or more of the liquid solvent in the atomized sampled to condense out and drop by the force of gravity into the solvent catcher 40 and out the drain outlet 49. The desolved atomized sample then passes into the spectrometer system 52 for spectral analysis.

Numerous tests were conducted with a plasma emission spectrometer sample analysis system that incorporates the nebulizer and/or desolvator of the present invention. The results of the tests are summarized as follows. First, tests were conducted using only the low flow rate, high efficiency nebulizer without the desolvator. As discussed previously, this arrangement resulted in only slight improvements in the emission intensities generated by the spectrometer because of the reduction in the plasma temperature created by the excess solvent in the sample. Next, tests were performed with the combination of the low flow rate, high efficiency nebulizer with the desolvator. These results were compared to the previous results using the nebulizer without the desolvator.

Figure 6A:
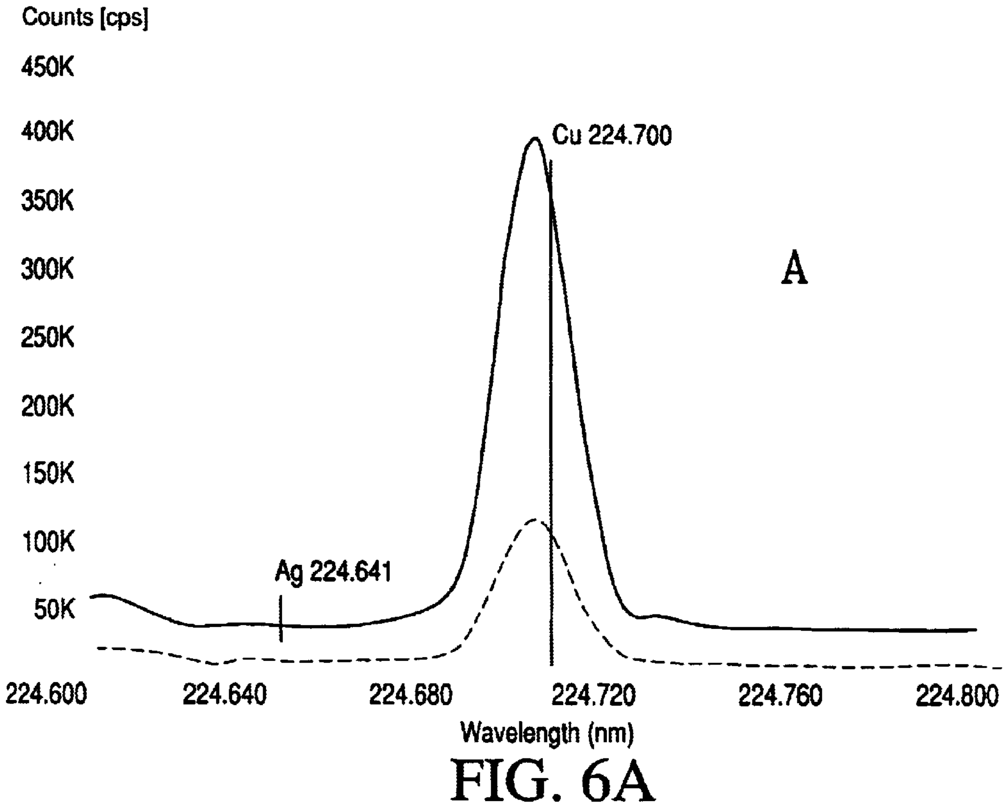
FIGS. 6–8 are graphs illustrating the intensity of measurements generated by a plasma emission spectrometer both with and without the desolvator of the preferred embodiment.
Figure 6B:
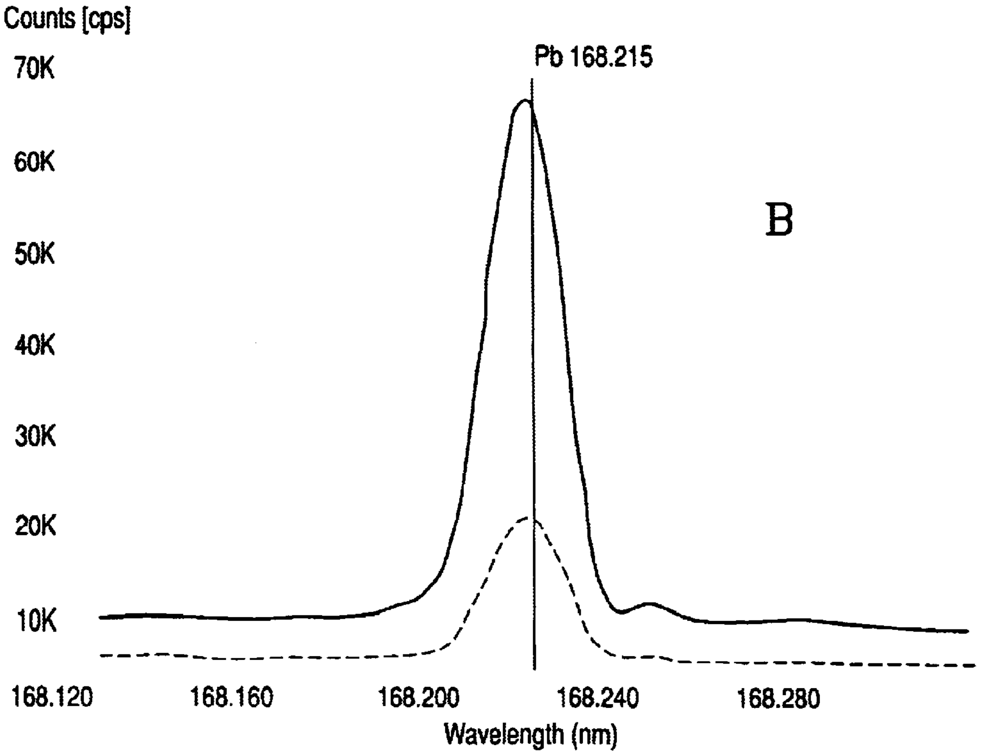

FIGS. 6A and 6B demonstrate the enhancement in sample signal with the desolvator on two analytes: Cu and Pb. In both graphs (A and B) a 1 ppm multi-element standard solution was introduced. The dashed lines show the resulting signal output when the sample was introduced through a nebulizer with only a spray chamber. The black lines (higher peaks) show the enhancement in sample signal when the nebulizer and spray chamber are combined with the desolvator.

Figure 7A:
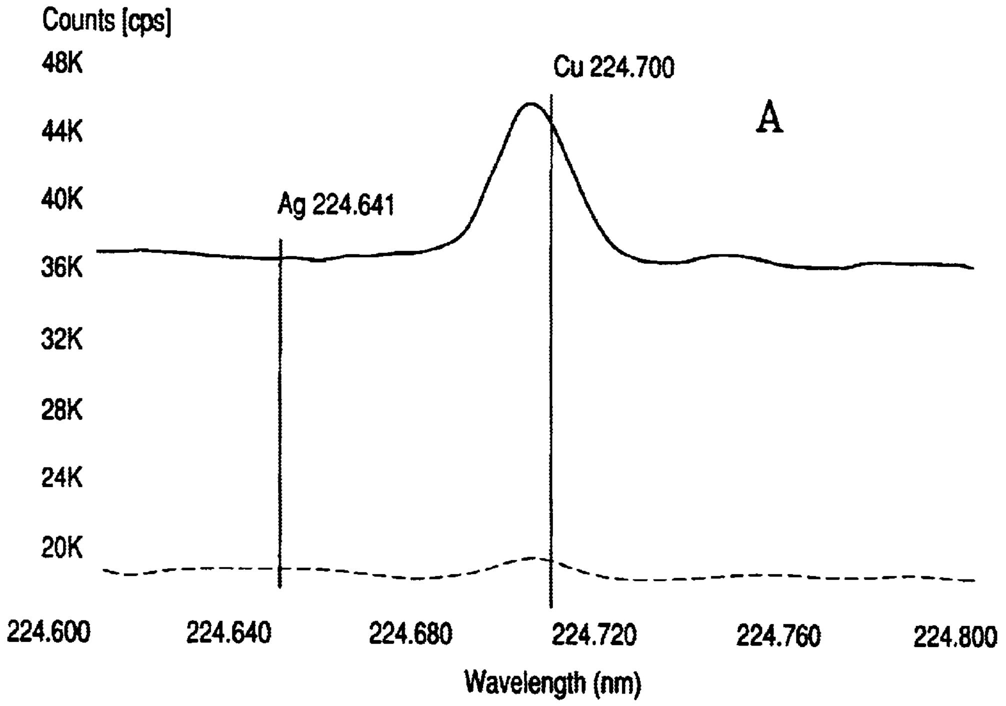
Figure 7B:
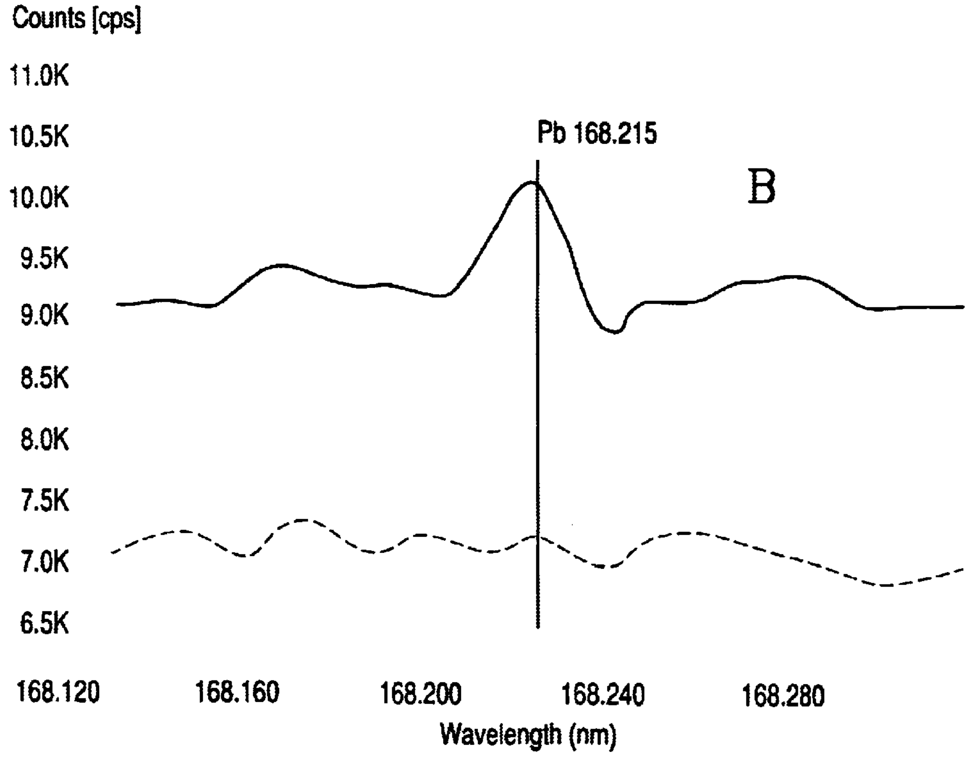
Figure 8A:
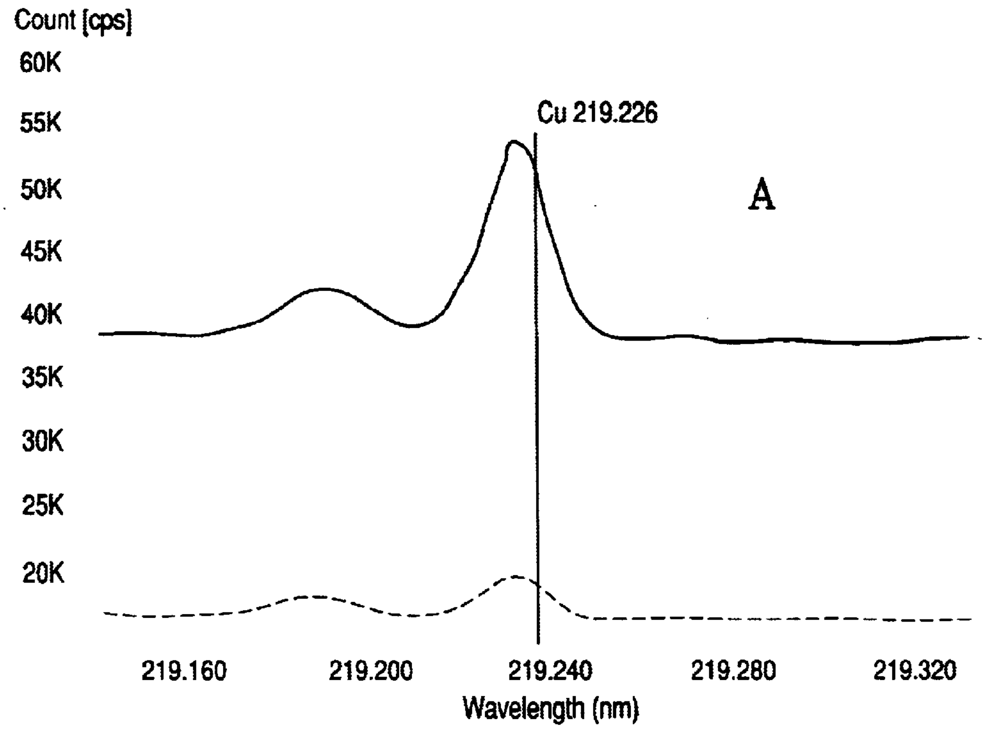
Figure 8B:
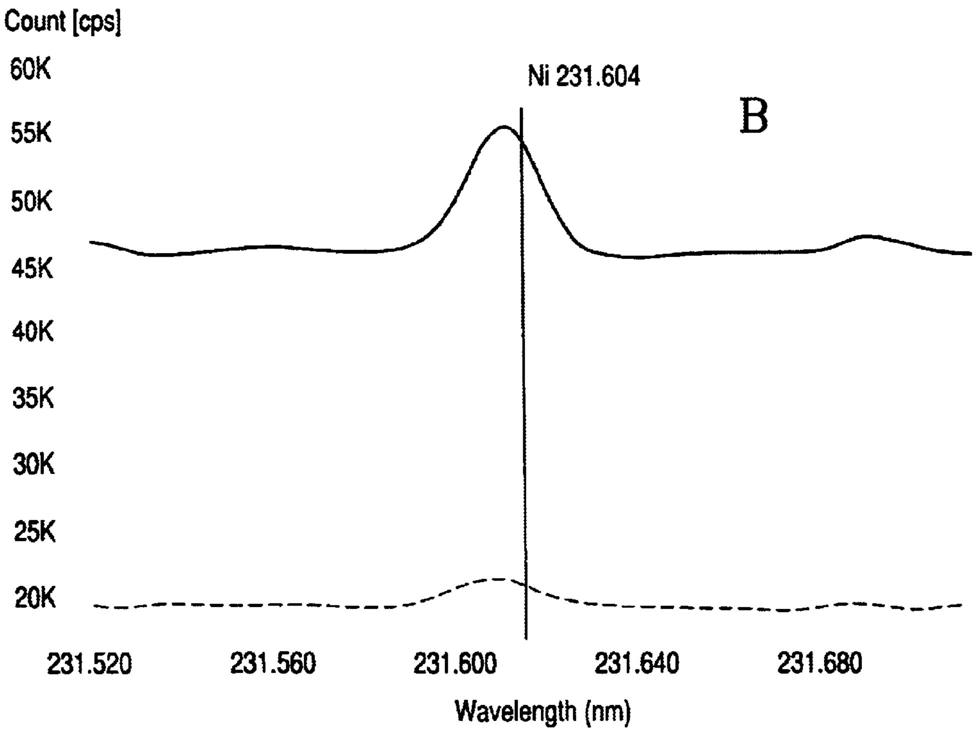

FIGS. 7A and 7B demonstrate the potential significance of this new technology to biological research. In both graphs (A and B) a 6 $\mu$l/ml sample of a single cell organism known as Chara vacuolar sap was introduced into the spectrometer system. The dashed lines show the resulting signals for Cu and Pb using the nebulizer without the desolvator. In neither case, could the element in question be detected. In sharp contrast, the black lines demonstrate that the addition of the desolvator for biological sample introduction enhances the signals for Pb and Cu enough to make these measurements possible. FIGS. 8A and 8B show a similar improvement on a High Purity Standard (HPS) Certified Reference Material Mixed Food Diet (Lot # 123215). These data demonstrate the potential significance of the desolvator for biological research. Analyses that previously were not possible due to insufficient signal from the dissolved samples are now possible with this system.

Figure 9:
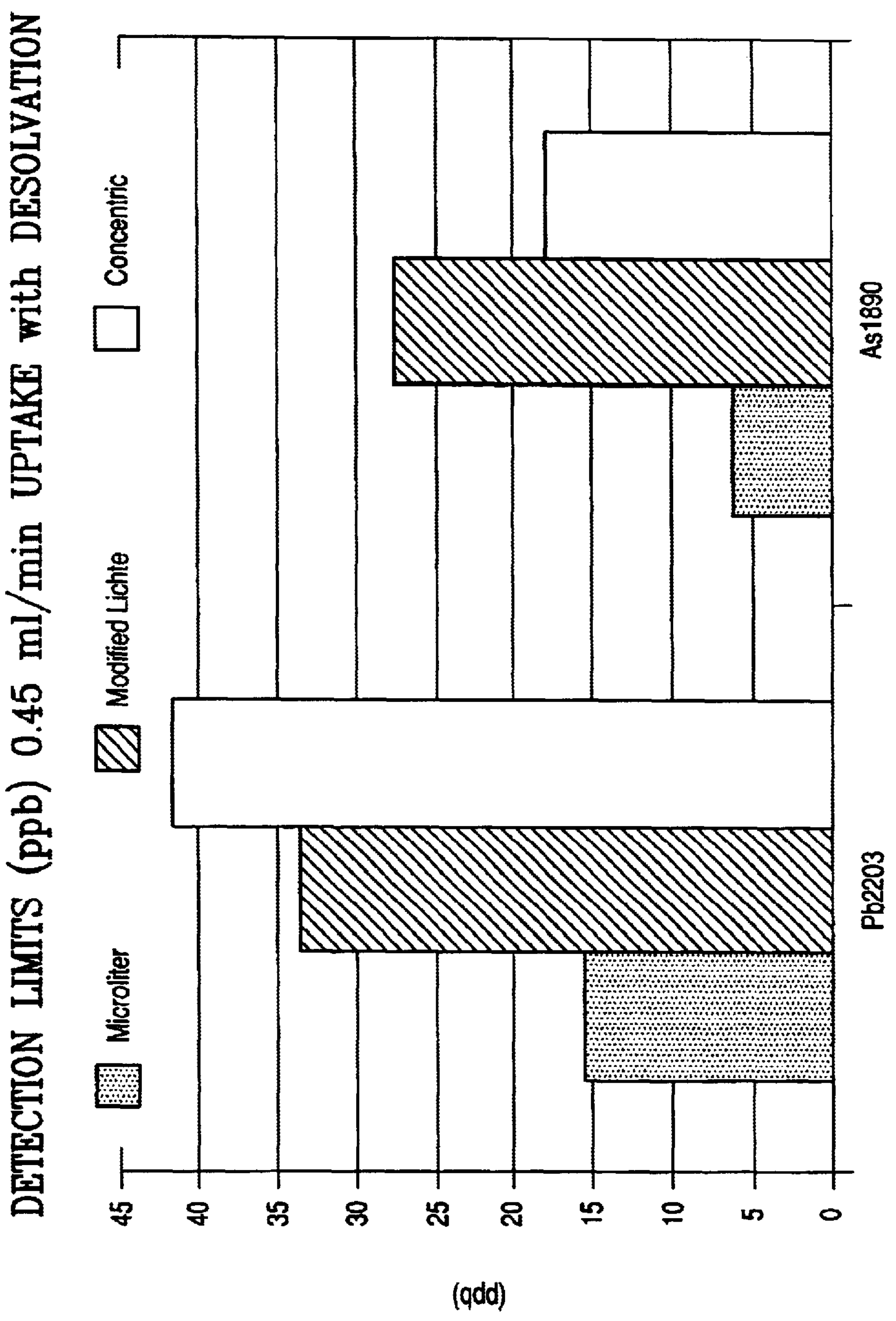
FIGS. 9 and 10 are bar graphs showing detection limits for two elements, lead and arsenic, for a plasma emission spectrometer using the preferred embodiment of the present invention and using two prior art nebulizers.
Figure 10:
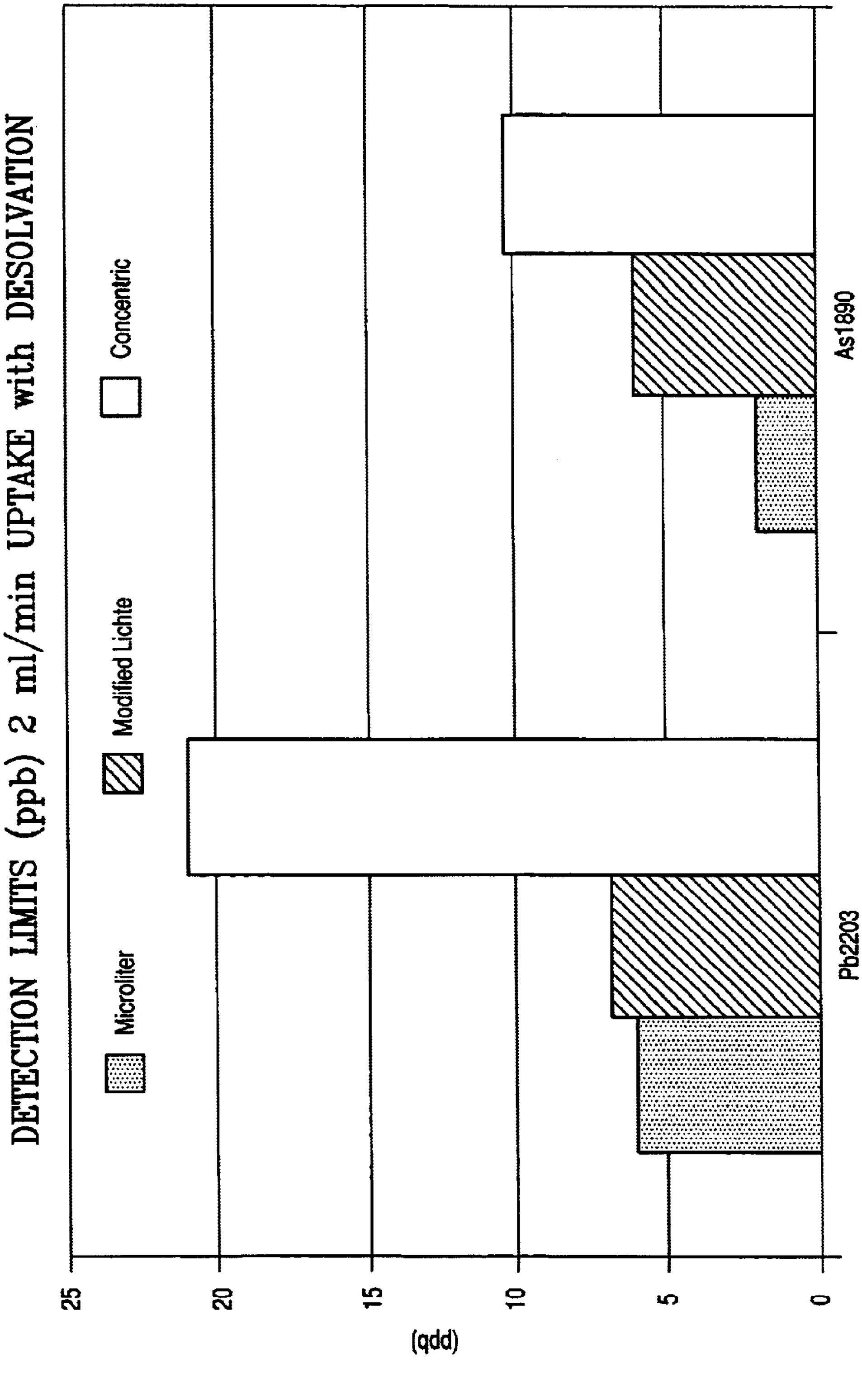

Additional tests were performed to compare the performance of the subject nebulizer/desolvator combination with other known nebulizers using the desolvator. Surprisingly, the results showed a synergistic effect from the combination of the subject low flow rate high efficiency nebulizer with the desolvator. In particular, marked improvements (decreases) in detection limits were noted with the subject combination, especially at low flow rates. However, combining the desolvator with two prior art nebulizers, a Babington type and a concentric type, did not result in the same marked improvements in detection limits. FIGS. 9 and 10 show the results of these tests for Pb and As at both 0.45 ml/min and 2.0 ml/min uptake rates. In almost every case, the subject system had substantially lower detection limits, especially for the lower flow rate test in which the detection limits were 2 to 5 times lower than the prior art nebulizers.

Although the invention has been disclosed in terms of a preferred embodiment and variations thereon, it will be understood that numerous additional variations and modifications could be made thereto without departing from the scope of the invention as set forth in the attached claims. For example, while the preferred embodiment has been disclosed as being designed for use with a plasma emission spectrometer, it should be understood that the system could be used with other types of spectrometers as well.

What is claimed is:

1. A system for generating and injecting an atomized sample into a spectrometer for analysis comprising:

a source of liquid sample to be analyzed;

a source of high pressure carrier gas;

a nebulizer connected to said liquid sample source and said carrier gas source for generating an atomized sample by entraining said liquid sample in said carrier gas;

a spray chamber for receiving said atomized sample from said nebulizer; and a desolvator for removing excess liquid solvent from said atomized sample, said desolvator including:

a heater tube for heating said atomized sample, said heater tube having an inlet end positioned to receive said atomized sample from said spray chamber and an outlet end; and a condensing tube for receiving said atomized sample from said outlet end of said heater tube and cooling said sample to remove excess liquid solvent from said atomized sample, said condensing tube having a bottom inlet end positioned to receive said sample from said outlet end of said heater tube and a top outlet end for delivering said sample to an inlet of a spectrometer.

2. The system of claim 1, wherein said nebulizer includes a body having:

a first, inlet end;

a second, discharge end;

a first passage having a liquid sample inlet for receiving a liquid sample to be atomized and a sample discharge orifice located at said discharge end; and a second passage having a carrier gas inlet for receiving high pressure carrier gas and a gas discharge orifice positioned adjacent said sample discharge orifice for discharging a high pressure gas stream;

whereby, passage of said high pressure gas stream through said gas discharge orifice causes entrainment of said liquid sample exiting said sample discharge orifice into said high pressure gas stream, thereby forming said atomized sample.

3. The system of claim 2, wherein said nebulizer further includes a discharge end surface that is roughened to enhance surface wetness.

4. The system of claim 3, wherein said nebulizer body is formed from glass and said discharge end surface is ground.

5. The system of claim 2, wherein said nebulizer body is formed from glass.

6. The system of claim 2, wherein said nebulizer discharge end has an outer diameter of approximately 2 mm.

7. The system of claim 6, wherein said discharge orifices are spaced apart from one another by no more than 1 mm.

8. The system of claim 2, wherein said nebulizer further includes an angled deflector positioned at said discharge end to deflect said gas stream and further enhance atomization of said liquid sample with said gas stream.

9. The system of claim 1, wherein said desolvator further includes a solvent catcher positioned between said outlet of said heater tube and said inlet of said condensing tube for catching excess solvent that is condensed in said condenser tube.

10. The system of claim 9, wherein said heater tube, said solvent catcher and said condensing tube are integrally formed in a u-shaped glass tube.

11. The system of claim 10, wherein said u-shaped glass tube has an inner thickness of no more than 1.0 inch in first and second portions forming said heater tube and said condensing tube, respectively.

12. A spectrometer system for analyzing atomized samples comprising:

a source of liquid sample to be analyzed;

a source of high pressure carrier gas;

a nebulizer connected to said liquid sample source and said carrier gas source for generating an atomized sample by entraining said liquid sample in said carrier gas;

a spray chamber for receiving said atomized sample from said nebulizer;

a desolvator for removing excess liquid solvent from said atomized sample, said desolvator including:

a heater tube for heating said atomized sample, said heater tube having an inlet end positioned to receive said atomized sample from said spray chamber and an outlet end; and a condensing tube for receiving said atomized sample from said outlet end of said heater tube and cooling said sample to remove excess liquid solvent from said atomized sample, said condensing tube having a bottom inlet end positioned to receive said sample from said outlet end of said heater tube and a top outlet end; and a spectrometer system for receiving said atomized sample from said outlet end of said condensing tube, said spectrometer system including:

a gas plasma torch for receiving and heating said sample to cause said sample to emit radiation of wavelengths that are related to an elemental composition of said sample; and a spectrometer for detecting wavelengths that are present in said radiation to identify elements in said sample.

13. The system of claim 12, wherein said nebulizer includes a body including:

a first, inlet end;

a second, discharge end;

a first passage having a liquid sample inlet for receiving a liquid sample to be atomized and a sample discharge orifice located at said discharge end; and a second passage having a carrier gas inlet for receiving high pressure carrier gas and a gas discharge orifice positioned adjacent said sample discharge orifice for discharging a high pressure gas stream;

whereby, passage of said high pressure gas stream through said gas discharge orifice causes entrainment of said liquid sample exiting said sample discharge orifice into said high pressure gas stream, thereby forming said atomized sample.

14. The system of claim 13, wherein said nebulizer further includes a discharge end surface that is roughened to enhance surface wetness.

15. The system of claim 14, wherein said nebulizer body is formed from glass and said discharge end surface is ground.

16. The system of claim 13, wherein said nebulizer body is formed from glass.

17. The system of claim 13, wherein said nebulizer discharge end has an outer diameter of approximately 2 mm.

18. The system of claim 17, wherein said discharge orifices are spaced apart from one another by no more than 1 mm.

19. The system of claim 13, wherein said nebulizer further includes an angled deflector positioned at said discharge end to deflect said gas stream and further enhance atomization of said liquid sample with said gas stream.

20. The system of claim 12, wherein said desolvator further includes a solvent catcher positioned between said outlet of said heater tube and said inlet of said condensing tube for catching excess solvent that is condensed in said condenser tube.

21. The system of claim 20, wherein said heater tube, said solvent catcher and said condensing tube are integrally formed in a u-shaped glass tube.

22. The system of claim 21, wherein said u-shaped glass tube has an inner thickness of no more than 1.0 inch in first and second portions forming said heater tube and said condensing tube, respectively.

23. A,nebulizer for generating an atomized liquid sample to be analyzed in a spectrometer, said nebulizer comprising a body including:

a first, inlet end;

a second, discharge end, said discharge end having a roughened surface for enhancing surface wetness;

a first passage having a liquid sample inlet for receiving a liquid sample to be atomized and a sample discharge orifice located at said discharge end; and a second passage having a carrier gas inlet for receiving high pressure carrier gas and a gas discharge orifice positioned adjacent said sample discharge orifice for discharging a high pressure gas stream;

whereby, passage of said high pressure gas stream through said gas discharge orifice causes entrainment of said liquid sample exiting said sample discharge orifice into said high pressure gas stream, thereby forming said atomized sample.

24. The nebulizer of claim 23, wherein said nebulizer body is formed from glass and said discharge end surface is ground.

25. The nebulizer of claim 23, wherein said nebulizer body is formed from glass.

26. The nebulizer of claim 23, wherein said nebulizer discharge end has an outer diameter of approximately 2 mm.

27. The nebulizer of claim 23, wherein said nebulizer further includes an angled deflector positioned at said discharge end to deflect said gas stream and further enhance atomization of said liquid sample with said gas stream.

28. The nebulizer of claim 23, wherein said nebulizer discharge end has an outer diameter of approximately 2 mm; and, said nebulizer further includes an angled deflector positioned at said discharge end to deflect said gas stream and further enhance atomization of said liquid sample with said gas stream.

* * * * *